(12) United States Patent
Watanabe et al.

(10) Patent No.: US 9,067,540 B2
(45) Date of Patent: Jun. 30, 2015

(54) STORAGE BOX

(71) Applicant: TOYODA GOSEI CO., LTD., Kiyosu-shi, Aichi-ken (JP)

(72) Inventors: Hiroto Watanabe, Kiyosu (JP); Masanori Mizuno, Kiyosu (JP); Michiyoshi Iwai, Kiyosu (JP); Tomohiro Sato, Inazawa (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/071,827

(22) Filed: Nov. 5, 2013

(65) Prior Publication Data

US 2014/0132023 A1    May 15, 2014

(30) Foreign Application Priority Data

Nov. 12, 2012 (JP) ................................ 2012-248653

(51) Int. Cl.
*B60R 7/06* (2006.01)
*B60R 13/02* (2006.01)

(52) U.S. Cl.
CPC ............... *B60R 7/06* (2013.01); *B60R 13/0206* (2013.01)

(58) Field of Classification Search
CPC ........................................................ B60R 7/06
USPC .......... 296/37.12, 37.1, 24.34, 37.6, 50, 57.1, 296/146.5, 191; 70/77
See application file for complete search history.

(56) References Cited

U.S. PATENT DOCUMENTS 7,048,311 B2 *  5/2006  Sawatani et al. ................. 292/33
7,422,261 B2 *  9/2008  Zellner et al. ............... 296/37.12

FOREIGN PATENT DOCUMENTS

JP    2010-111306 A    5/2010
JP    2011-073469 A    4/2011

* cited by examiner

*Primary Examiner* — Joseph D Pape
*Assistant Examiner* — Dana Ivey
(74) *Attorney, Agent, or Firm* — Posz Law Group, PLC

(57) ABSTRACT

Provided is a storage box comprising an outer panel and an inner panel which are easily and firmly combined with each other without employing vibrational welding or screws. The outer panel and the inner panel are integrally combined by claw engagement portions. The claw engagement portions comprise at least one positioning claw engagement portion for determining relative positions of the outer panel and the inner panel, and at least one undetectable claw engagement portion for restricting the outer panel and the inner panel from moving in directions to be separated from each other.

6 Claims, 6 Drawing Sheets

STORAGE BOX

BACKGROUND OF THE INVENTION

1. Field of the Invention

The present invention relates to a storage box such as a glovebox, an instrument panel upper box and a console box.

2. Description of the Related Art

A glovebox of an automobile is opened or closed by a glovebox door which is turnably held by an instrument panel. Automotive gloveboxes of recent years often employ an integral structure of a storage portion and a glovebox door. Such a glovebox is produced by assembling an outer panel having a designed surface and formed of resin, and an inner panel having a storage portion and formed of resin.

Conventionally the outer panel and the inner panel have been combined to ether by screws, but this assemble method has an aesthetic problem in that when the glovebox door is open, heads of the screws are seen. This assemble method has another problem in that worker-hours for an assembling operation increase because the screws have to be fastened at a plurality of locations.

Therefore, these days, vibration welding is employed to combine the outer panel and the inner panel as described in Japanese Unexamined Patent Publication No. 2010-111306.

Vibration welding is a welding process of bringing a pair of members to be combined in contact under an applied load and vibrating one of the members so as to generate heat by friction and weld fore ends of welding ribs or others of the one of the members to a welding surface of the other of the members. Therefore, in order to uniformly transmit force of pressure to the respective welding ribs, projecting directions of the respective welding ribs need to be in parallel to a pressure direction.

In a case of such an automotive interior part having a greatly curved designed surface as a glovebox door, however, if the projecting directions of the respective welding ribs are set in parallel to the pressure direction, angles of the respective welding ribs with respect to a surface of the mating member to be welded vary by area, and some welding ribs forming small angles with the surface are liable to fall down toward an acute angle side. Hence, the pressure force is not uniformly transmitted to the respective welding ribs, and the welding ribs are not uniformly welded to the surface. This sometimes causes a blemish in designed appearance such as highlighted portions.

In these circumstances, Japanese Unexamined Patent Publication NO. 2011-073469 has proposed a glovebox door comprising an inner panel having an inner surface on which a plurality of welding projections are formed in a manner to project in a direction of pressure applied for vibration welding, and an outer panel having an inner surface including a first surface and a second surface whose cross section tangent lines intersect with each other, wherein at least one of the first surface and the second surface has a receiving flat surface which faces to a fore end of one of the welding projections and extends in a perpendicular direction to the direction of the pressure applied for the vibration welding, and the fore end of the welding projection is welded to the receiving flat surface.

Even if this glovebox door has a greatly curved designed surface, all the welding projections can be uniformly welded and a blemish in designed appearance and other problems can be prevented beforehand.

However, therein en inevitable variation in welding precision in vibration welding. Even the structure of PTL 2 has a problem in that a large number of worker-hours are necessary for production preparations. The vibration welding has another problem in that large-scale equipment is necessary and production plants are limited.

CITATION LIST

Patent Literature

[PTL 1] Japanese Unexamined Patent Publication No. 2010-111306

[PTL 2] Japanese Unexamined Patent Publication No. 2011-073469

BRIEF SUMMARY OF THE INVENTION

The present invention has been made in view of these circumstances. It is an object of the present invention to provide a storage box comprising an outer panel and an inner panel which are easily and firmly combined with each other without employing vibration welding or screws.

A storage box according to the present invention, which solves the above problems, has an integrally combined portion of an outer panel and an inner panel and used in an environment in which a load may be inevitably applied to the combined portion in a direction to separate the outer panel and the inner panel, wherein the outer panel and the inner panel are integrally combined by a plurality of claw engagement portions, and the claw engagement portions comprise at least one positioning claw engagement portion for determining relative positions of the outer panel and the inner panel, and at least one undetachable claw engagement portion for restricting the outer panel and the inner panel from moving in directions to be separated from each other.

The storage box of the present invention is assembled very easily because the outer panel and the inner panel can be integrally combined with each other by claw engagement. Therefore, limitations on production facilities are lifted and a production plant can be selected from more options. In addition, since the positioning claw engagement portion determines relative positions of the outer panel and the inner panel, positioning in an assembly operation is easy. Furthermore, even when a load is inevitably applied in a direction to separate the outer panel and the inner panel, the undetachable claw engagement portion prevents the outer panel and the inner panel from being separated or forming a gap between each other.

BRIEF DESCRIPTION OF THE DRAWINGS

The exact nature of this invention, as well as other objects and advantages of thereof, will be readily apparent from consideration of the following specification relating to the accompanying sheets of drawings, in which.

DETAILED DESCRIPTION OF THE PRESENT INVENTION

Figure 1:
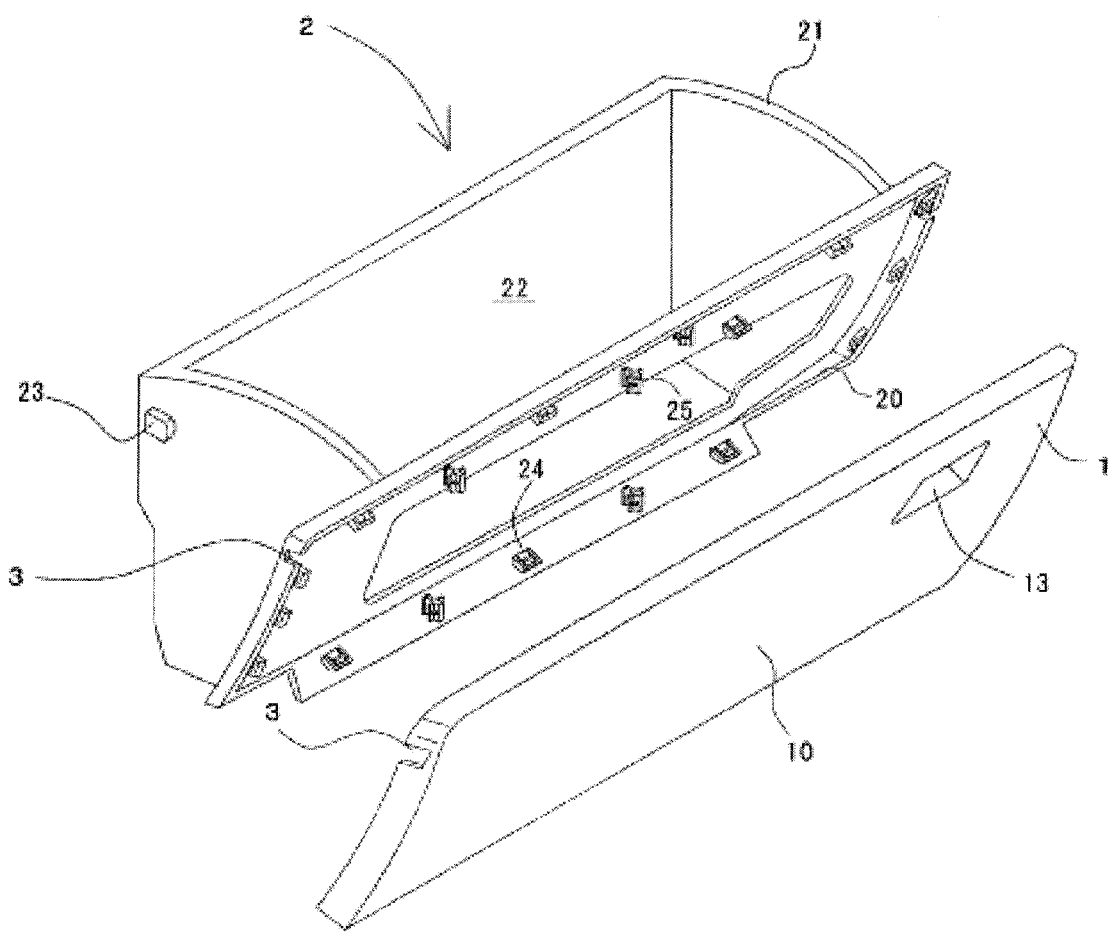
FIG. 1 is an exploded perspective view of a glovebox according to a preferred embodiment of the present invention.

A storage box of the present invention has an integrally combined portion of an outer panel and an inner panel. When the storage box is, for example, a glovebox, it is desirable that a door of the glovebox employs the structure of the present invention. Gloveboxes of recent years often employ an integral structure of a storage portion and a glovebox door. In such a glovebox, an outer panel having a designed surface and formed of resin and is integrally formed with an inner panel having a storage portion and formed of resin. When a door of such a glovebox is turned toward a passenger compartment around a rotation center located at a lower end thereof, stoppers provided on the inner panel get, stuck with an instrument panel and the turn stops. At this time, a rear surface of the outer panel extends almost horizontally, and an object to be stored can be placed on the rear surface.

However, an unexpected load is sometimes applied to the rear surface: for example, a very heavy object may be placed on the rear surface or an automobile occupant may place his or her hand and put his or her weight on the rear surface. Then, since the inner panel as restricted from being turned by the stoppers, a load is applied to the outer panel in a direction to be separated from the inner panel. According to the present invention, however, since the outer panel, and the inner panel are firmly combined with each other by at least one undetachable claw engagement portion, the outer panel and the inner panel are effectively prevented from being separated or forming a gap between each other.

When the storage box is, for example, a console box, a cool air passage is often formed between an inner panel and an outer panel at a side of the console box. In this case, too, the inner panel and the outer panel can be integrally combined with each other by claw engagement of the present invention. Even when an automobile occupant steps and puts his or her weight on die console box, the outer panel and the inner panel are effectively prevented from being separated or forming a gap between each other by at least one undetachable claw engagement portion.

The storage box has a plurality of claw engagement portions, and the claw engagement portions comprise at least one positioning claw engagement portion for determining relative positions of the outer panel and the inner panel and at least one undetachable claw engagement portion for restricting the outer panel and the inner panel from moving in directions to be separated from each other.

The positioning claw engagement portion is constituted by engagement of a claw member and an engagement recessed portion, and determines relative positions of the outer panel and the inner panel in three-dimensional directions (in longitudinal, lateral, and vertical directions). For example, a position in two-dimensional directions can be determined by a contact of the claw member with side walls of the engagement recessed portion, and a position in a remnant one direction can be determined by a contact of a restricting surface formed on the claw member with a surface of the engagement recessed portion. Although in some cases only one positioning claw engagement portion is sufficient when the outer panel and the inner panel have a small area it is preferred to form a plurality of positioning claw engagement portions. It is also preferred that at least one positioning claw engagement portion is provided at a corner portion of the outer panel and the inner panel.

The undetachable claw engagement portion is a claw engagement portion engagement in which once a claw member and an engagement recessed portion are engaged with each other, the engagement, cannot be cancelled without being broken down. Although the undetachable claw engagement portion can employ a variety of structures, it is preferred to employ a combination of a claw member having a left and right pair of stopper surfaces and having an anchor shape or an arrow cross sectional shape, and an engagement recessed portion comprising a pair of J-shaped cross sectional portions facing each other with a space between each other. In a case of this undetachable claw engagement portion, if the claw member is pushed into the gap between the J-shaped cross sectional portions, the J-shaped cross sectional portions are elastically deformed to allow the claw member to fit in a recess between the J-shaped cross sectional portions. Then the pair of stopper surfaces of the claw member comes in contact with fore ends of the pair of the J-shaped cross sectional portions, thereby preventing the claw member from getting out of the engagement recessed portion. This kind of undetachable claw engagement portion leaves no effect on a designed surface of an outer panel or an inner panel.

When the storage box is a glovebox, it is preferred that at least one undetachable claw engagement portion is provided on an inner side of the positioning claw engagement portion. When the glovebox door is open, a load tends to be applied to an inner side on which an object to be stored is to placed rather than an outer side. Furthermore, with regard to the claw engagement portion, it is preferred that the claw member is provided on the inner panel and the engagement recessed portion is provided on the outer panel. In assembling the outer panel and the inner panel, it is common to push one of the out panel and the inner panel which has the claw member against the other which has the engagement recessed portion. This arrangement can prevent the push in the assembling operation from causing a damage on a designed surface of the outer panel.

PREFFERED EMBODIMENT OF THE PRESENT INVENTION

Hereinafter, the present invention will be described in detail by way of a preferred embodiment.

FIG. 1 shows an exploded perspective view of a storage box of the present embodiment before being assembled. This storage box is a glovebox of an automobile and mainly comprises an outer panel 1 formed of resin and an inner panel 2 formed of resin. A front surface 10 of the outer panel 1 constitutes the same designed surface as a front surface of an instrument panel not shown.

Figure 2:
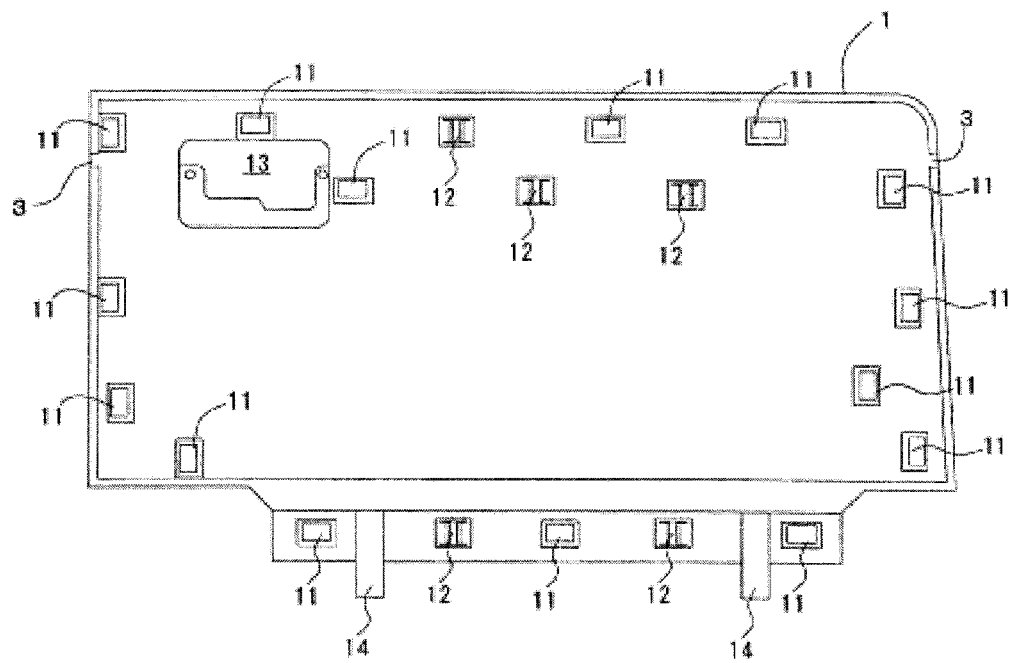
FIG. 2 is a rear elevational view of an outer panel of the glovebox according to the preferred embodiment of the present invention.
Figure 7:
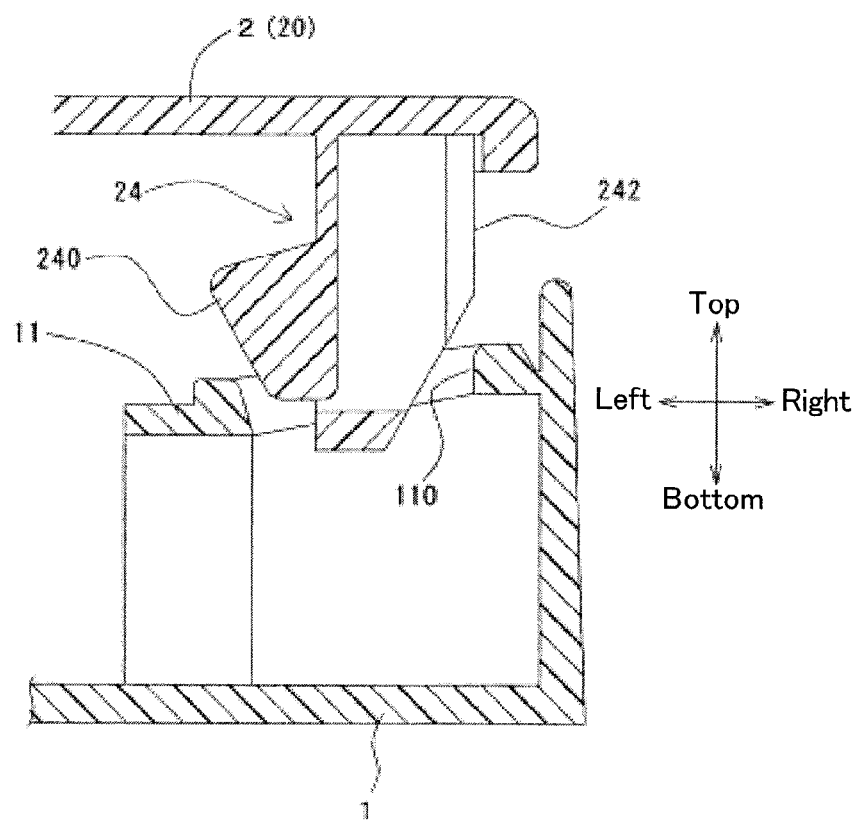
FIG. 7 is a cross sectional view of a positioning claw engagement portion of the glovebox according to the preferred embodiment of the present invention before being combined.

A rear surface of the outer panel 1 shown in FIG. 2 has a plurality of first engagement recessed portions 11 and a plurality of second engagement recessed portions 12. The first engagement recessed portions 11 are formed a lot on a peripheral portion and corner portions of the outer panel 1, and as shown in FIG. 7, each of the first engagement recessed portions 11 has a through hole 110 at a distant position from the rear surface of the outer panel 1. The outer panel 1 has a knob opening 13 in which a door knob not shown is installed. The outer panel 1 also has hinge portions 14 at a lower end thereof.

Figure 6:
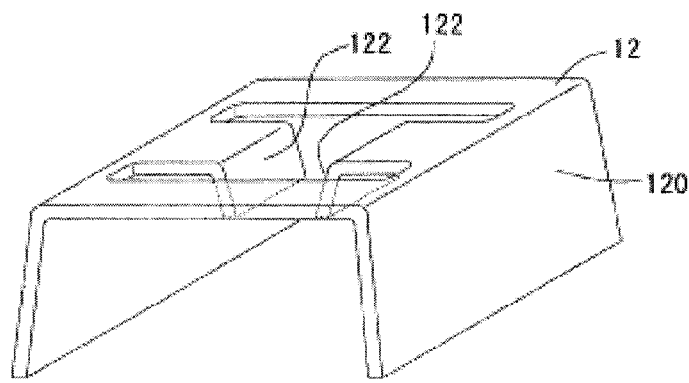
FIG. 6 is a perspective view of a second engagement recessed portion of the glovebox according to the preferred embodiment of the present invention.
Figure 9:
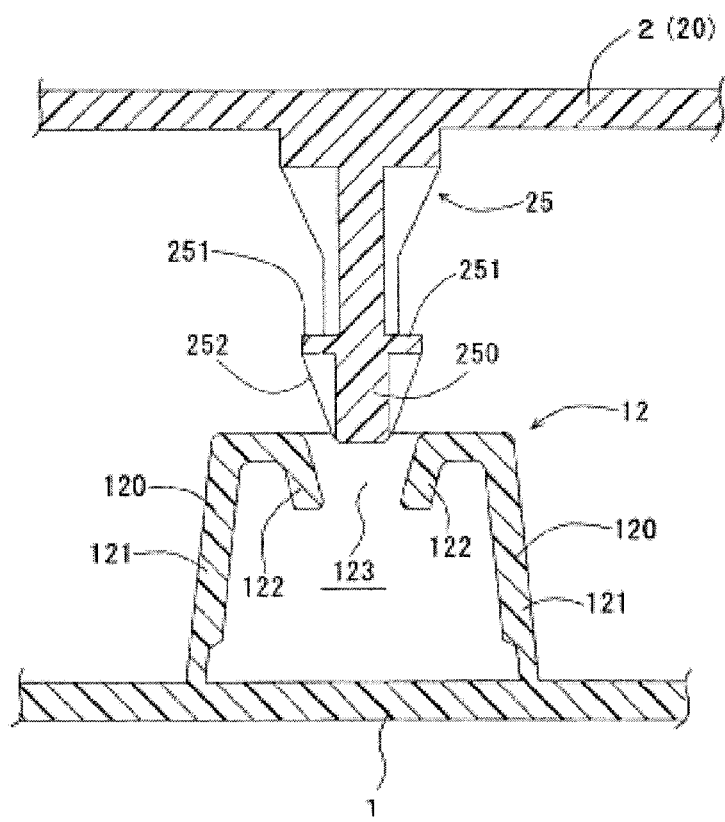
FIG. 9 is a cross sectional view of an undetachable claw engagement portion of the glovebox according to the preferred embodiment of the present invention before being combined.

The second engagement recessed portions 12 are formed a lot on an inner side of the first engagement recessed portions 11. As shown in the perspective view of FIG. 6, each of the second engagement recessed portions 12 has a pair of bulged portions 120 each shaped of a plate with a J-shaped cross section as shown in FIG. 9. The pair of bulged portions 120 comprise two leg portions 121 standing from the rear surface of the outer panel 1, and two head portions 122 formed by bending fore ends of the leg portions 121 in a direction to approach to each other and then bending the fore ends of the leg portions 121 in a direction to face the rear surface of the outer panel 1, and a gap 123 is formed between the pair of head portions 122. The pair of head portions 122 are elastically deformable in directions to approach to and move away from each other.

Figure 3:
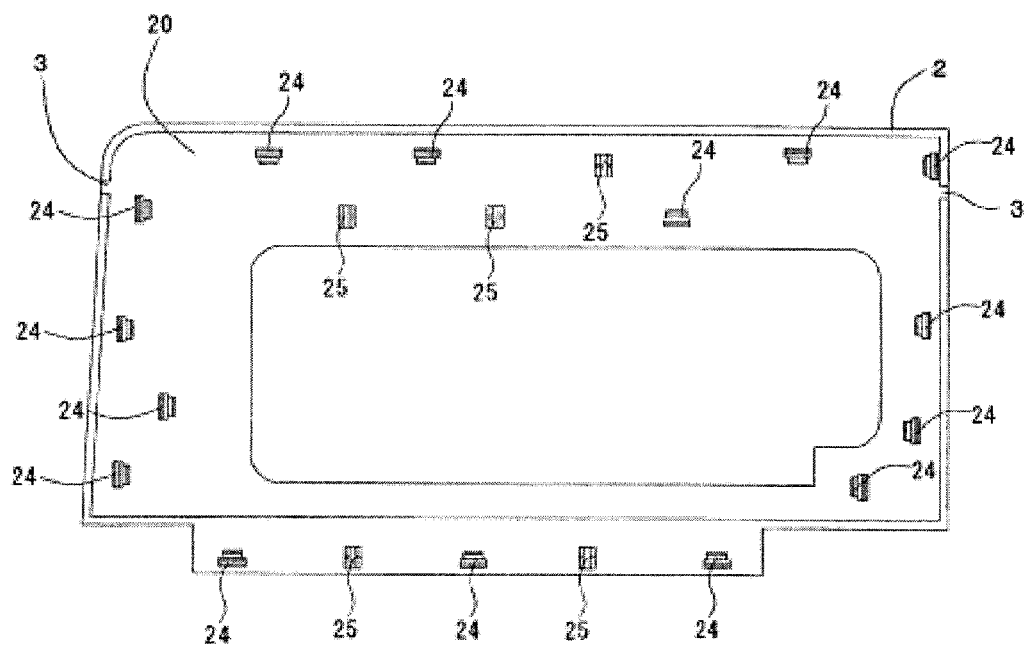
FIG. 3 is a front elevational view of an inner panel of the glovebox according to the preferred embodiment of the present invention.

As shown in FIG. 3, the inner panel 3 comprises a frame portion 20 having a shape corresponding to shape of the rear surface of the outer panel 1 and to be combined with the outer panel 1, and a storage portion 21 having a vessel shape and projecting from the frame portion 20 in an opposite direction to the outer panel 1. The frame portion 20 is shaped of a frame with a central opening. A top of the storage portion 21 has an opening portion 22 one side of which is constituted by an upper edge of the frame portion 20. A stopper 23 protrudes from each of a pair of side walls of the storage portion 21 and gets stuck with part of a rear surface side of an instrument panel when the glovebox is tilted.

Figure 4:
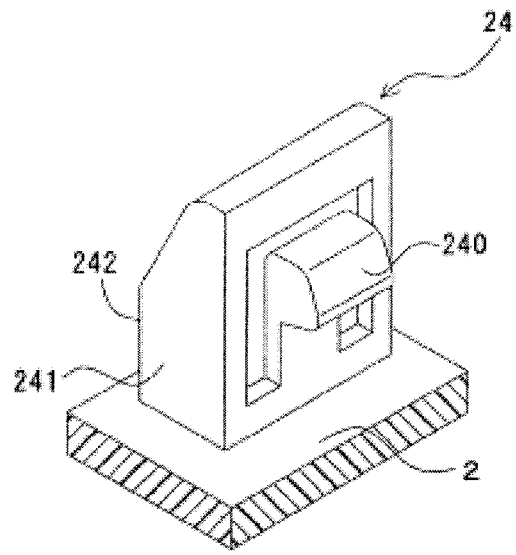
FIG. 4 is a perspective view of a first claw member of the glovebox according to the preferred embodiment of the present invention.

A plurality of first claw members 24 and a plurality of second claw members 25 are formed on the frame portion 20 of the inner panel 2 in a manner to project towards the outer panel 1. The first claw members 24 are to fit in the through holes 110 of the first engagement recessed portions 11 of the outer panel 1, and are formed in positions corresponding to those of the through holes 110. That is to say, the first claw members 24 are formed a lot at a peripheral portion and corner portions of the inner panel 2. As shown in FIG. 4, each of the first claw members 24 comprises an elastically deformable claw portion 240, and first restricting surfaces 241 and second restricting surfaces 242 which contact a periphery of the through hole 110.

Figure 5:
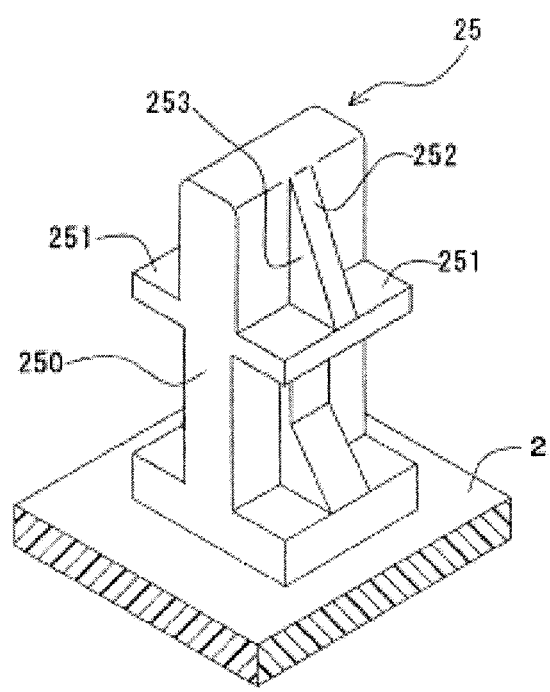
FIG. 5 is a perspective view of a second claw member of the glovebox according to the preferred embodiment of the present invention.

As shown in FIG. 5, each of the second claw members 25 comprises a pillar portion 250 and a pair of flange portions 251 protruding in both perpendicular directions from a distant position on the pillar portion 250 from a fore end thereof. Each of the second claw members 25 also has reinforcing ribs 253 having tapered surfaces 252 which connect the fore end of the pillar portion 250 and the flange portions 251.

With latch lock pins and the door knob not shown installed, the outer panel 1 and the inner panel 2 are overlaid on each other in a manner that a front surface of the frame portion 20 of the inner panel 2 faces the rear surface of the outer panel 1, and the frame portion 20 is pushed against the outer panel 1. The first claw members 24 are pushed into the through holes 110 of the first engagement recessed portions 11, and the second claw members 25 are pushed into the gaps 123 between the respective pairs of head portions 122 of the second engagement recessed portions 12. Since the frame portion 20 of the inner panel 2 is pushed, damages on the designed surface of the outer panel 1 can be prevented beforehand.

Note that upon tilting the door knob not shown, latch lock pins not shown advance or retreat through cutouts 3 in both left and right edges of the outer panel 1 and the inner panel 2, and thus the glovebox door can be switched between lock and unlock.

Figure 8:
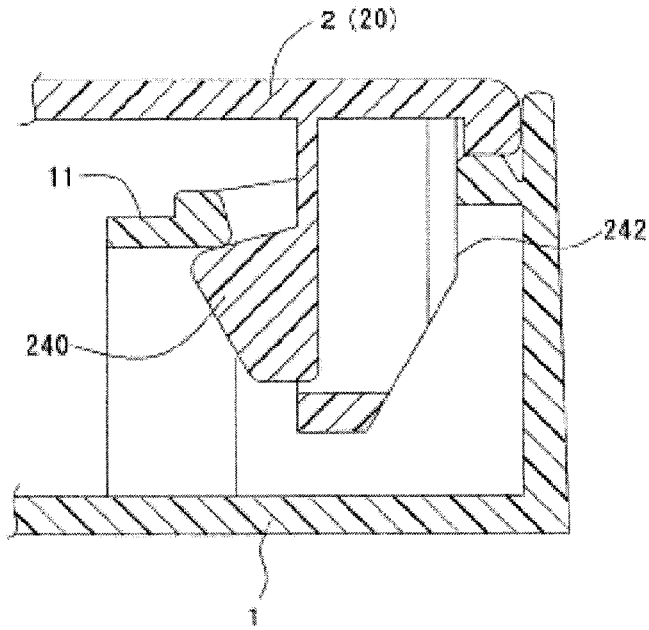
FIG. 8 is a cross sectional view of the positioning claw engagement portion of the glovebox according to the preferred embodiment of the present invention after being combined.

With the claw portion 240 elastically deformed, each of the first claw members 24 is inserted into the through hole 110 of each of the first engagement recessed portions 11. Since at this time the first restricting surfaces 241 contact an inner peripheral surface of the through hole 110, a position of the first claw member 24 in a perpendicular direction to the sheet of FIG. 7 is determined. Moreover, since the second restricting surfaces 242 contact the inner peripheral surface of the though hole 110, a position of the first claw member 24 in left and right directions in FIG. 7 is determined. Furthermore, after inserted as shown in FIG. 8, while the claw portion 240 contacts the inner peripheral portion of the through hole 110, a peripheral portion of the frame portion 20 contacts a peripheral portion of the first engagement recessed portion 11. Thus, a position of the first claw member 24 in upward and downward directions is determined.

Owing to this engagement of the first claw members 24 and the first engagement recessed portions 11, relative positions of the cuter panel 1 and the inner panel 1 can be precisely determined and thus positioning claw engagement portions are formed. At the same time, the second claw members 25 precisely engage with the second engagement recessed portions 12.

Figure 10:
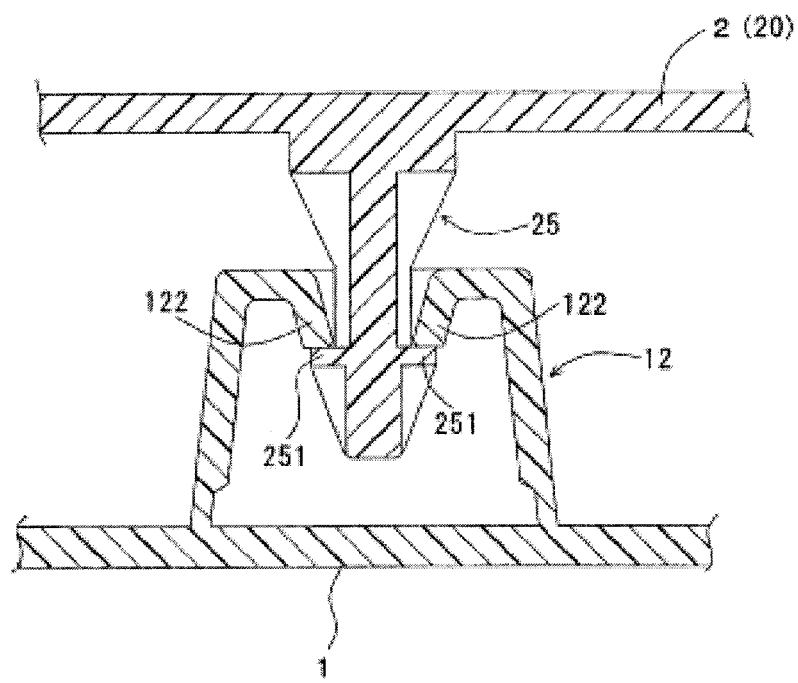
FIG. 10 is a cross sectional view of the undetachable claw engagement portion of the glovebox according to the preferred embodiment of the present invention after being combined.

In this engagement of each of the second claw portions 25 with each of the second recessed portions 12, as shown in FIG. 9, the tapered surfaces 252 are pushed into the gap 123 between the pair of head portions 122 of the second engagement recessed portion 12, and the pair of head portions 122 are elastically deformed in directions to get away from each other. Owing to this deformation, the pair of flange portions 251 pass through the gap 123. Then the pair of head portions 122 more in direction to approach to each other by elastic reaction force and recover their original shape. Then, as shown in FIG. 10, the pair of flange portions 251 contact fore end surfaces of the pair of head portions 122, so the second claw member 25 cannot be detached from the second engagement recessed portion 12. Thus, undetachable claw engagement portions are formed.

Therefore, in the glovebox of the present embodiment, relative positions of the outer panel 1 and the inner panel 2 can be precisely determined by the positioning claw engagement portions. At the same time, the outer panel 1 and the inner panel 2 are firmly and integrally combined with each other by the undetachable claw engagement portions. For example, suppose that while toe glovebox door is open, a heavy object is placed on the rear surface of the outer panel 1. Since the inner panel 2 is engaged with the instrument panel 2 by the stoppers 23, a large load is applied to the outer panel 1 in a direction to be separated from the inner panel 2. However, since the undetachable claw engagement portions are formed a lot in an inner peripheral portion of the frame portion 20, the outer panel 1 and the inner panel 2 are prevented from being separated or forming a gap between each other.

In addition, in each of the undetachable claw engagement portions, a dimensional difference between the second claw member 25 and the second engagement recessed portions 12 can be adsorbed by elastic deformation of the pair of head portions 122, so rattling can be prevented.

Obviously, many modifications and variations of the present invention are possible in the light of the above teachings. It is therefore to be understood that within the scope of the appended claims, the invention may be practiced otherwise than as specifically described.

INDUSTRIAL APPLICABILITY

The storage box or the present invention can be applied not only to vehicles but also home electronics, ships, aircrafts and so on.

What is claimed is:

1. A storage box having an integrally combined portion of an outer panel and an inner panel and used in an environment in which a load may be inevitably applied to the combined portion in a direction separating the outer panel and the inner panel, comprising:
    a plurality of claw engagement portions integrally combining the outer panel and the inner panel together, the claw engagement portions including:
    at least one positioning claw engagement portion for determining relative positions of the outer panel and the inner panel for joining the outer and inner panels together, each positioning claw engagement portion including at least a first engagement recessed portion arranged within one panel of the outer and inner panels and at least a first claw member arranged on another panel of the outer and inner panels, and
    at least one undetachable claw engagement portion for restricting the outer panel and the inner panel from moving in directions to be separated from each other, each undetachable claw engagement portion including at least a second engagement recessed portion arranged within the one panel of the outer and inner panels and at least a second claw member arranged on the another panel of the outer and inner panels.

2. The storage box according to claim 1, wherein the positioning claw engagement portion is provided at a corner portion of the outer panel and the inner panel.

3. The storage box according to claim 1, wherein the one undetachable claw engagement portion is provided on an inner side of the positioning claw engagement portion.

4. The storage box according to claim 1, wherein the first and second claw members are provided on the inner panel and the first and second engagement recessed members are provided on the outer panel.

5. The storage box according to claim 1, wherein the storage box is a glovebox of an automobile, the integrally combined portion is a glovebox door, and the inner panel integrally has a storage portion.

6. A storage box having an integrally combined portion of an inner panel fastened to an outer panel and used in an environment in which a load may be inevitably applied to the combined portion in a direction to separate the outer panel and the inner panel, which comprises:
    engagement recessed portions arranged on at least one panel of the outer and inner panels,
    claw members arranged on at least another panel of the outer and inner panels,
    at least one positioning claw engagement portion configured to position the outer and inner panels relative to each other when combining the outer and the inner panels together, each positioning claw engagement portion including at least a first engagement recessed portion provided within the one panel of the outer and inner panels and at least a first claw member provided on the another panel of the outer and inner panels, and
    at least one undetachable claw engagement portion configured to restrict movement of the outer panel and inner panels in directions where the outer and inner panels separate from each other, each undetachable claw engagement portion including at least a second engagement recessed portion provided within the one panel of the outer and inner panels and at least a second claw member provided on the another panel of the outer and inner panels.

* * * * *